United States Patent
Ogihara

(10) Patent No.: US 9,634,822 B2
(45) Date of Patent: Apr. 25, 2017

(54) INFORMATION PROCESSING DEVICE AND METHOD FOR DETERMINING PATH RANGE

(71) Applicant: FUJITSU LIMITED, Kawasaki-shi, Kanagawa (JP)

(72) Inventor: Kazutaka Ogihara, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 226 days.

(21) Appl. No.: 14/593,055

(22) Filed: Jan. 9, 2015

(65) Prior Publication Data
US 2015/0249596 A1    Sep. 3, 2015

(30) Foreign Application Priority Data

Feb. 28, 2014    (JP) ................................. 2014-039489

(51) Int. Cl.
*H04L 5/14* (2006.01)
*H04L 12/721* (2013.01)
(Continued)

(52) U.S. Cl.
CPC ............. *H04L 5/14* (2013.01); *H04L 45/123* (2013.01); *H04L 43/0852* (2013.01); *H04L 45/24* (2013.01)

(58) Field of Classification Search
CPC ....... H04L 45/00; H04L 45/24; H04L 45/123; H04L 45/26; H04L 5/14; H04L 41/0668; H04L 45/28; H04L 41/0826; H04L 43/0852; H04L 45/122; H04L 43/00; H04L 5/1438; H04L 45/22; H04L 45/16; H04L 43/16; H04L 45/302; H04L 45/125; H04L 45/245; H04L 43/08; H04L 45/12
(Continued)

(56) References Cited

U.S. PATENT DOCUMENTS 5,963,746 A * 10/1999 Barker ................ G06F 15/8007
709/238
6,857,026 B1 * 2/2005 Cain ....................... H04L 45/00
370/389
(Continued)

FOREIGN PATENT DOCUMENTS

| JP | 11-312058 | 11/1999 |
|---|---|---|
| JP | 2011-100414 | 5/2011 |
| JP | 2012-155479 | 8/2012 |

*Primary Examiner* — Michael Thier
*Assistant Examiner* — Rownak Islam
(74) *Attorney, Agent, or Firm* — Staas & Halsey LLP

(57) ABSTRACT

An information processing device includes a first storage unit and a processor. The first storage unit is configured to store therein setting information designating a path range. The path range is one of a subset of a plurality of communication paths and a full set of the plurality of communication paths. The processor is configured to perform communication through a communication path included in a first path range designated by first setting information stored in the first storage unit. The processor is configured to acquire performance information of the respective communication paths included in the first path range. The processor is configured to select a second path range between the subset and the full set on basis of the acquired performance information. The processor is configured to store second setting information designating the selected second path range in the first storage unit.

8 Claims, 9 Drawing Sheets

(51) Int. Cl.
*H04L 12/707* (2013.01)
*H04L 12/26* (2006.01)

(58) Field of Classification Search
USPC .................................................. 370/228, 225
See application file for complete search history.

(56) References Cited

U.S. PATENT DOCUMENTS

| | | | | |
|---|---|---|---|---|
| 7,404,005 | B1* | 7/2008 | Burton | H04L 45/12 |
| | | | | 709/224 |
| 2002/0015050 | A1* | 2/2002 | Kawai | G06T 11/00 |
| | | | | 345/635 |
| 2005/0005038 | A1* | 1/2005 | Ayukawa | G06F 3/0601 |
| | | | | 710/38 |
| 2011/0096675 | A1* | 4/2011 | Li | H04L 43/10 |
| | | | | 370/252 |
| 2014/0280904 | A1* | 9/2014 | Bugenhagen | H04L 43/50 |
| | | | | 709/224 |
| 2015/0030025 | A1* | 1/2015 | Hopkins | H04L 45/24 |
| | | | | 370/392 |
| 2016/0164786 | A1* | 6/2016 | Fukuda | H04L 45/38 |
| | | | | 370/236 |

* cited by examiner

INFORMATION PROCESSING DEVICE AND METHOD FOR DETERMINING PATH RANGE

CROSS-REFERENCE TO RELATED APPLICATION

This application is based upon and claims the benefit of priority of the prior Japanese Patent Application No. 2014-039489, filed on Feb. 28, 2014, the entire contents of which are incorporated herein by reference.

FIELD

The embodiments discussed herein are related to an information processing device and a method for determining a path range.

BACKGROUND

Information processing devices usually include a host device that performs an arithmetic process and a storage device that stores data. The host device transmits and receives data to and from the storage device. In such an information processing device, when only one communication path is provided between the host device and the storage device, if a failure occurs in the communication path, a service that the storage device provides to the host device, such as transmission and reception of data may not be continued. The failure in the communication path that causes the service to be interrupted may be, for example, a disorder or malfunction of a cable between the host device and the storage device, a disorder or malfunction of hardware which is an interface on the host device side, or a disorder or malfunction of hardware which is an interface on the storage device side.

Accordingly, resistance to failure has been enhanced by multiplexed communication path (multipath) between the host device and the storage device. By multiplexing the path between the host device and the storage device, even if there is a failure in one communication path, it is possible to avoid interruption of the service that the storage device provides to the host device, by using another path.

In such an information processing device having a configuration of the multiplexed communication path, there is concern that the input/output (I/O) response performance of each communication path viewed from the host device may not be stabilized.

As a technique of duplexed communication path, there is a related technique in the data transmission, that determines a path to pass through based on whether a data size exceeds a setting value or not. Further, there is a related technique that divides and transmits data in accordance with the occupancy ratio of the respective communication paths. In addition, there is a related technique that duplexes a controller and assigns logical volumes corresponding to each controller.

Related techniques are disclosed in, for example, Japanese Laid-open Patent Application No. 2011-100414, Japanese Laid-open Patent Application No. 2012-155479, and Japanese Laid-open Patent Application No. 11-312058.

When a host device accesses a physical disk or a logical disk (hereinafter, simply referred to as a "disk") included in a storage device using a plurality of communication paths, response times of respective communication paths may be different from each other.

For example, there is a technique of duplexing a communication path by using two connection forms called a straight access and a cross access, as access forms from the host device to the disk. The straight access is communication in which a host device transmits and receives data to and from a disk, by accessing a disk controller for the disk that controls reading and writing of the disk without passing through another disk controller. In contrast, the cross access is communication in which a host device transmits and receives data to and from a disk by accessing a disk controller for the disk through another disk controller. That is, in the case of the cross access, communication between disk controllers is performed in the communication between the host device and the disk.

The response time of the cross access becomes longer than the response time of the straight access. However, the host device may be unaware of whether the access to the disk is the straight access or the cross access. In this case, since the response time varies depending on the communication path used, the host device may determine that the I/O performance of the storage device is not stable. Further, when the response time varies depending on the communication path, a failure may occur depending on applications.

In order to avoid the difference in the response times between the communication paths, the communication paths may be restricted to either one of the straight access and the cross access. In this case, it is possible to deal with a failure in a communication path, but it is not possible to deal with a failure in a controller, and the resistance to failure may be lowered.

In the related technique of determining the path to pass through by using the setting value of the data size or the related technique of determining the path in accordance with the occupancy ratio of the communication path, response times are not taken into consideration, and it is difficult to reduce deterioration of responses due to performance variations among communication paths. In the related technique of assigning a logical volume corresponding to each controller, the communication paths are not basically duplexed, and even if the communication paths are duplexed, response times are not taken into consideration. Therefore, it is difficult to reduce deterioration of responses due to performance variations among communication paths while resistance to failure is maintained.

SUMMARY

According to an aspect of the present invention, provided is an information processing device including a first storage unit and a processor. The first storage unit is configured to store therein setting information designating a path range. The path range is one of a subset of a plurality of communication paths and a full set of the plurality of communication paths. The subset is used in a limited communication. The full set is used in an unlimited communication. The processor is configured to perform communication through a communication path included in a first path range designated by first setting information stored in the first storage unit. The processor is configured to acquire performance information of the respective communication paths included in the first path range. The performance information indicates a performance of communication through a communication path. The processor is configured to select a second path range between the subset and the full set on basis of the acquired performance information. The processor is configured to store second setting information designating the selected second path range in the first storage unit.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments of an information processing device and a method for determining a path range are described in detail with reference to the drawings. The information processing device and the method for determining a path range disclosed in the present application are not limited to the embodiments.

First Embodiment

Figure 1:
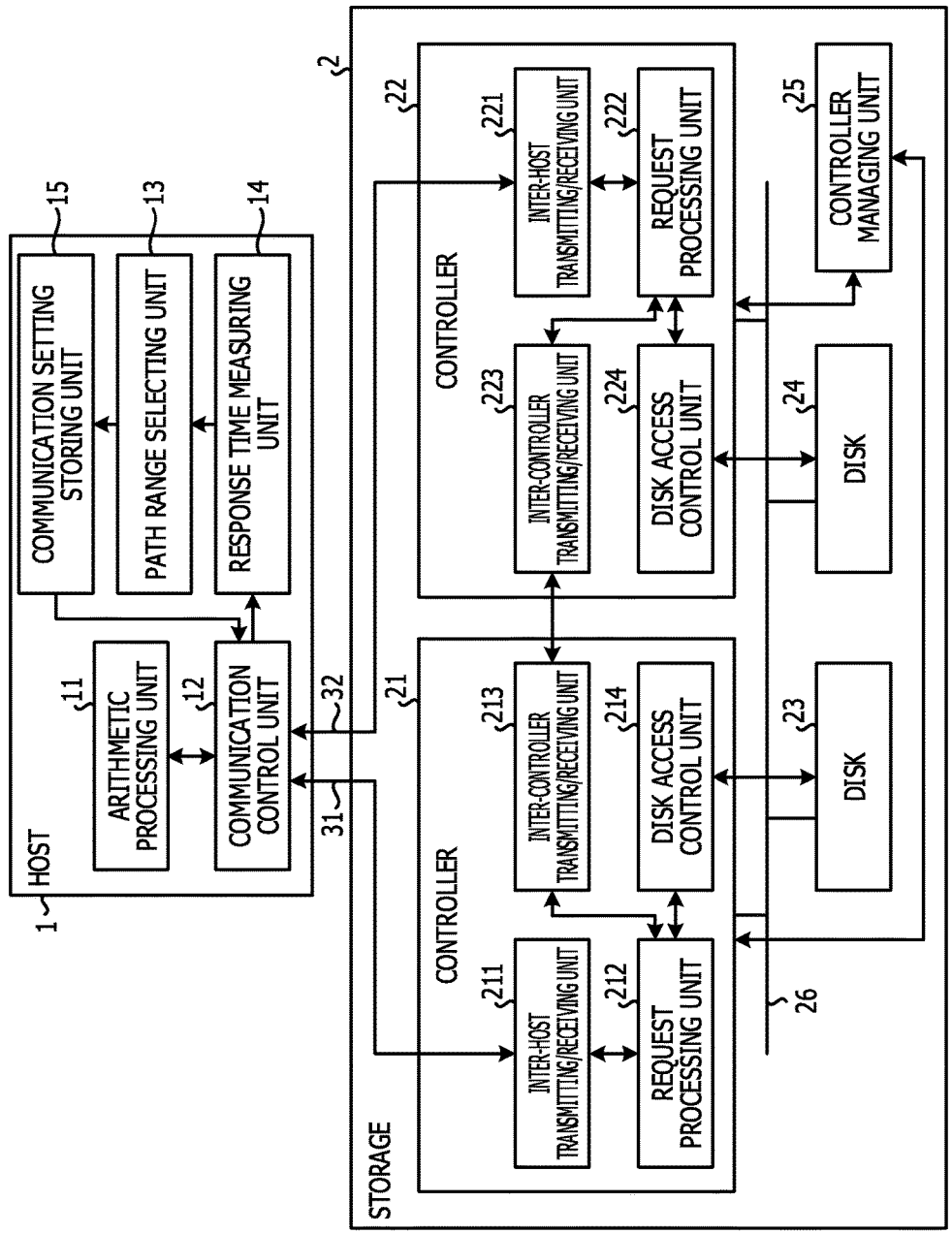
FIG. 1 is a diagram illustrating a functional configuration of an information processing device according to a first embodiment.

FIG. 1 is a diagram illustrating a functional configuration of an information processing device according to a first embodiment. The information processing device according to the first embodiment includes a host device 1 and a storage device 2.

The host device 1 is an arithmetic processing device performing an arithmetic process by executing an application program. The storage device 2 includes a plurality of hard disks. The host device 1 and the storage device 2 are connected through communication paths 31 and 32. The communication paths 31 and 32 are, for example, fiber channels. The host device 1 performs the reading of data from the storage device 2 and the writing of data to the storage device 2, through the communication paths 31 and 32.

The host device 1 includes an arithmetic processing unit 11, a communication control unit 12, a path range selecting unit 13, a response time measuring unit 14, and a communication setting storing unit 15.

The arithmetic processing unit 11 executes an operating system (OS). In addition, the arithmetic processing unit 11 executes an application program. The arithmetic processing unit 11 outputs to the communication control unit 12 a processing request, for reading or writing data, generated by executing the application program. In the case of a processing request for reading data, the arithmetic processing unit 11 receives from the communication control unit 12 data input according to the request. In the following, processing requests for reading or writing data are collectively referred to as "I/O requests".

The path range selecting unit 13 stores whether "unlimited communication" or "limited communication" is to be used in the communication setting storing unit 15. In the unlimited communication, communication is performed by using both of the communication paths 31 and 32 as a communication path range. In the limited communication, communication is performed by using one of the communication paths 31 and 32 as a communication path range. In the following, path range determination by the path range selecting unit 13 is described in detail.

When power to the host device 1 is turned on, the path range selecting unit 13 stores in the communication setting storing unit 15 setting information designating a path range including both of the communication paths 31 and 32 for the unlimited communication.

Then, the path range selecting unit 13 receives a response time of a communication path to be used, from the response time measuring unit 14. Specifically, in the case where the unlimited communication is performed, the path range selecting unit 13 receives a response time of communication through the communication path 31 and a response time of communication through the communication path 32, from the response time measuring unit 14. In the case where the limited communication is performed, the path range selecting unit 13 receives a response time of the currently used communication path, between the communication paths 31 and 32, from the response time measuring unit 14.

Then, the path range selecting unit 13 maintains the received response time for a certain period of time. The certain period of time, for example, may be set to 1 minute. After the certain period of time elapses, the path range selecting unit 13 obtains an average of the response times for each communication path, and sets the obtained average to be the response time for each communication path.

The path range selecting unit 13 determines whether the unlimited communication or the limited communication is used with reference to the communication setting storing unit 15. As described below, setting information designating a path range to be used in the communication, between a path range for the unlimited communication and a path range for the limited communication, is stored in the communication setting storing unit 15.

If the unlimited communication is performed, the path range selecting unit 13 obtains a difference between the response times of the communication paths 31 and 32. Then, the path range selecting unit 13 determines whether the obtained difference in the response times is equal to or greater than a threshold value. If the difference in the response times is less than the threshold value, the path range selecting unit 13 stands by for a certain period of time, and repeats the determination of whether the difference in the response times is equal to or greater than the threshold value.

When the difference in the response times is equal to or greater than the threshold value, the path range selecting unit 13 determines to limit the communication paths to the communication path of which the response time is shorter between the communication paths 31 and 32. Thereafter, the path range selecting unit 13 stores, in the communication setting storing unit 15, setting information designating a path range for the limited communication, which includes the communication path of which the response time is shorter.

When the limited communication is performed, the path range selecting unit 13 obtains the response time of communication through a communication path used in the communication, between the communication paths 31 and 32. Then, the path range selecting unit 13 determines whether the obtained response time is equal to or greater than a predetermined time. When the response time is less than the predetermined time, the path range selecting unit 13 stands by for a certain period of time, and repeats the determination of whether the response time is equal to or greater than the predetermined time.

When the response time is equal to or greater than the predetermined time, the path range selecting unit 13 determines that the unlimited communication is to be performed. Thereafter, the path range selecting unit 13 stores, in the communication setting storing unit 15, setting information designating a path range for the unlimited communication, which includes both of the communication paths 31 and 32.

The communication control unit 12 receives an I/O request from the arithmetic processing unit 11. Next, the communication control unit 12 refers to the communication setting storing unit 15 to acquire the setting information. Then, the communication control unit 12 determines a communication path for outputting the I/O request on the basis of the acquired setting information. Thereafter, the communication control unit 12 outputs the I/O request to the controller 21 or 22 connected to the determined communication path.

Specifically, in the case of the unlimited communication, the communication control unit 12 selects, in round-robin fashion, one of the communication paths 31 and 32 to which the I/O request is output, and outputs the I/O request to the selected communication path. In the case of the limited communication, the communication control unit 12 outputs the I/O request to the communication path designated by the setting information between the communication paths 31 and 32.

When the I/O request is a processing request for reading data, the communication control unit 12 receives the data from the controller 21 or 22 connected to the communication path that outputs the I/O request. Then, the communication control unit 12 outputs the acquired data to the arithmetic processing unit 11. When the I/O request is a processing request for writing data, the communication control unit 12 receives a notification that the writing of the data is completed, from the controller 21 or 22 connected to the communication path to which the I/O request is output.

The response time measuring unit 14 measures the time from a time point when the communication control unit 12 outputs the I/O request to the controller 21 or 22 to a time point when the communication control unit 12 receives the response. Then, the response time measuring unit 14 outputs the measurement result to the path range selecting unit 13 as the response time of communication through the communication path between the communication paths 31 and 32, through which the communication control unit 12 outputs the I/O request.

The storage device 2 includes controllers 21 and 22, disks 23 and 24, a controller managing unit 25, and a bus 26. The controllers 21 and 22 are examples of a "control unit".

The disks 23 and 24 may be physical disks or logical disks. The disks 23 and 24 are respectively connected to the controllers 21 and 22 through the bus 26. The control of reading and writing of data from and to the disk 23 is performed by the controller 21, and the control of reading and writing of data from and to the disk 24 is performed by the controller 22. Though two disks of the disks 23 and 24 are described in the first embodiment, the number of disks is not particularly limited.

The controller 21 includes an inter-host transmitting/receiving unit 211, a request processing unit 212, an inter-controller transmitting/receiving unit 213, and a disk access control unit 214. The controller 22 includes an inter-host transmitting/receiving unit 221, a request processing unit 222, an inter-controller transmitting/receiving unit 223, and a disk access control unit 224.

The controllers 21 and 22 have the same functions. Specifically, the inter-host transmitting/receiving unit 221 has the same function as the inter-host transmitting/receiving unit 211. The request processing unit 222 has the same function as the request processing unit 212. The inter-controller transmitting/receiving unit 223 has the same function as the inter-controller transmitting/receiving unit 213. The disk access control unit 224 has the same function as the disk access control unit 214.

In the following, an example of the process of an I/O request regarding the disk 24 is described. In this case, the controller 21 mediates a process between the communication control unit 12 and the controller 22 on the disk 24. The controller 22 receives an I/O request regarding the disk 24 directly from the communication control unit 12 or via the controller 21, and performs the process on the disk 24. Here, the expression "receiving an I/O request directly from the communication control unit 12" refers to receiving the I/O request from the communication control unit 12 without another controller being interposed. That is, a disk access to the disk 24 by an I/O request transmitted via the controller 21 may be referred to as a cross access, and a disk access to the disk 24 by an I/O request transmitted from the communication control unit 12 directly to the controller 22 may be referred to as a straight access. In this case, the communication performed via the controller 21 has a response time longer than the communication without the controller 21 being interposed.

The inter-host transmitting/receiving unit 211 is connected to the communication control unit 12 through the communication path 31. In the case of the unlimited communication, the inter-host transmitting/receiving unit 211 receives an I/O request from the communication control unit 12 to the disk 24 in round-robin fashion. Then, the inter-host transmitting/receiving unit 211 outputs the I/O request regarding the disk 24 to the request processing unit 212.

The inter-host transmitting/receiving unit 211 receives a response to the I/O request regarding the disk 24, which has been output by the inter-host transmitting/receiving unit 211 itself, from the request processing unit 212. Then, the inter-host transmitting/receiving unit 211 outputs, to the communication control unit 12, the response to the I/O request regarding the disk 24.

The request processing unit 212 receives the I/O request regarding the disk 24 from the inter-host transmitting/receiving unit 211. Then, the request processing unit 212 outputs the I/O request regarding the disk 24 to the inter-controller transmitting/receiving unit 213.

The request processing unit 212 receives the response to the I/O request regarding the disk 24, which has been output by the request processing unit 212 itself, from the inter-controller transmitting/receiving unit 213. Then, the request processing unit 212 outputs, to the inter-host transmitting/receiving unit 211, the response to the I/O request regarding the disk 24.

The inter-controller transmitting/receiving unit 213 receives the I/O request regarding the disk 24 from the request processing unit 212. Then, the inter-controller transmitting/receiving unit 213 outputs the I/O request regarding the disk 24 to the inter-controller transmitting/receiving unit 223 of the controller 22.

The inter-controller transmitting/receiving unit 213 receives the response to the I/O request regarding the disk 24, which has been output by the inter-controller transmitting/receiving unit 213 itself, from the inter-controller transmitting/receiving unit 223. Then, the inter-controller transmitting/receiving unit 213 outputs, to the request processing unit 212, the response to the I/O request regarding the disk 24.

The inter-host transmitting/receiving unit 221 is connected to the communication control unit 12 through the communication path 32. In the case of the unlimited communication, the inter-host transmitting/receiving unit 221 receives an I/O request regarding the disk 24 from the communication control unit 12 in round-robin fashion. A response time of the communication regarding the disk 24 in the case where the controller 22 receives an I/O request directly from the communication control unit 12 is shorter than in the case where the controller 21 is interposed therebetween. Hence, in the case of the limited communication, the inter-host transmitting/receiving unit 221 receives an I/O request regarding the disk 24 from the communication control unit 12. Then, the inter-host transmitting/receiving unit 221 outputs the I/O request regarding the disk 24 to the request processing unit 222.

The inter-host transmitting/receiving unit 221 receives a response to the I/O request regarding the disk 24, which has been output by the inter-host transmitting/receiving unit 221 itself, from the request processing unit 222. Then, the inter-host transmitting/receiving unit 221 outputs, to the communication control unit 12, the response to the I/O request regarding the disk 24.

In the case of the straight access, the request processing unit 222 receives the I/O request regarding the disk 24 from the inter-host transmitting/receiving unit 221. In the case of the cross access, the request processing unit 222 receives the I/O request regarding the disk 24 from the inter-controller transmitting/receiving unit 223. Then, the request processing unit 222 outputs the I/O request regarding the disk 24 to the disk access control unit 224.

The request processing unit 222 receives, from the disk access control unit 224, the response to the I/O request regarding the disk 24. Then, the request processing unit 222 outputs, to the transmission source of the I/O request, the response to the I/O request regarding the disk 24. That is, in the case of the straight access, the request processing unit 222 outputs, to the inter-host transmitting/receiving unit 221, the response to the I/O request regarding the disk 24. In the case of the cross access, the request processing unit 222 outputs, to the inter-controller transmitting/receiving unit 223, the response to the I/O request regarding the disk 24.

The disk access control unit 224 receives the I/O request regarding the disk 24 from the request processing unit 222. Then, the disk access control unit 224 performs a process such as the reading or the writing of the data on the disk 24 in accordance with the I/O request. Then, the disk access control unit 224 outputs, to the request processing unit 222, the response to the I/O request regarding the disk 24.

In the above, examples of the I/O processing on the disk 24 are described. In the case of the I/O processing on the disk 23, the roles of the controller 21 and the controller 22 are reversed.

When a failure occurs in the communication from the communication control unit 12 via the controller 22, the controller 21 receives a control switching instruction from the controller managing unit 25. Then, the controller 21 takes over the process performed by the controller 22. Specifically, the disk access control unit 214 performs the control of the process on the disk 24. The inter-host transmitting/receiving unit 211 receives the I/O request which is to be transmitted to the controller 22 in absence of the failure, and transmits the I/O request to the disk access control unit 214 via the request processing unit 212. Here, an example of switching the controller 22 to the controller 21 is described, but switching the controller 21 to the controller 22 is performed in the same manner.

The controller managing unit 25 monitors operations of the controllers 21 and 22. Then, if a failure occurs in the communication of any one of the controller 21 and 22 with the communication control unit 12, the controller managing unit 25 transmits the control switching instruction to the other.

Figure 2:
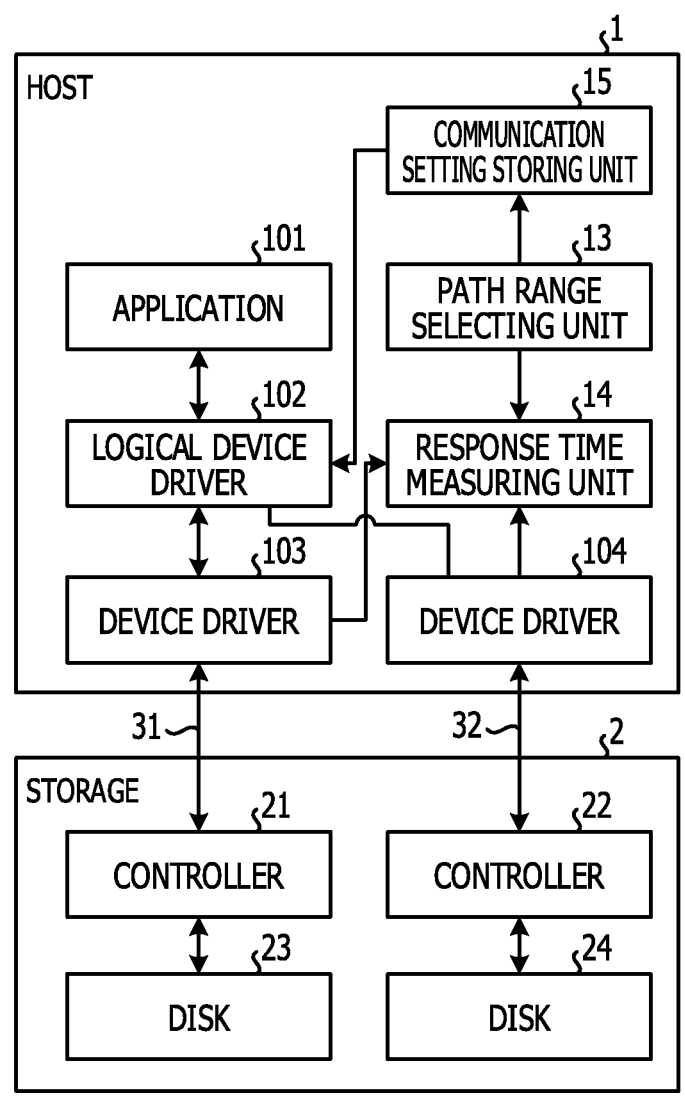
FIG. 2 is a diagram illustrating a functional configuration by focusing on I/O processing of the information processing device according to the first embodiment.

FIG. 2 is a diagram illustrating a functional configuration by focusing on I/O processing of the information processing device according to the first embodiment. In the following, the path range selecting process is described again with reference to FIG. 2.

A logical device driver 102 and device drivers 103 and 104 are realized by the arithmetic processing unit 11 executing an OS. The logical device driver 102 and the device drivers 103 and 104 have a function of the communication control unit 12. The device drivers 103 and 104 are drivers corresponding to the controller 21 and 22, respectively. The logical device driver 102 is a driver for integrating the operations of the device drivers 103 and 104.

An application 101 is realized by the arithmetic processing unit 11 executing an application program. When reading or writing of data is performed, the application 101 outputs an I/O request to the logical device driver 102.

The response time measuring unit 14 measures, as a response time of communication through the communication path 31, the time from a time point when an I/O request is output from the device driver 103 to a time point when a response thereto is returned to the device driver 103. The response time measuring unit 14 also measures the time from a time point when an I/O request is output from the device driver 104 to a time point when a response thereto is returned to the device driver 104 as a response time of communication through the communication path 32. Then, the response time measuring unit 14 outputs the measurement result to the path range selecting unit 13. The response time measuring unit 14 corresponds to an example of a "measurement unit".

The path range selecting unit 13 selects a path range to be used in the communication, between one of the communication paths 31 and 32 or both of the communication paths 31 and 32, in accordance with the measurement result received from the response time measuring unit 14. Then, the path range selecting unit 13 cause the communication setting storing unit 15 to store setting information designating the selected path range.

The communication setting storing unit 15 receives the setting information from the path range selecting unit 13 and stores the setting information therein. Then, the logical device driver 102 outputs an I/O request received from the application 101 to one of the device drivers 103 and 104 in accordance with the setting information stored in the communication setting storing unit 15. In the case of the unlimited communication, the logical device driver 102 transmits the I/O request to one of the device drivers 103 and 104 in round-robin fashion.

The device driver 103 outputs the I/O request received from the logical device driver 102 to the controller 21 through the communication path 31.

The device driver 104 outputs the I/O request received from the logical device driver 102 to the controller 22 through the communication path 32.

Figure 3:
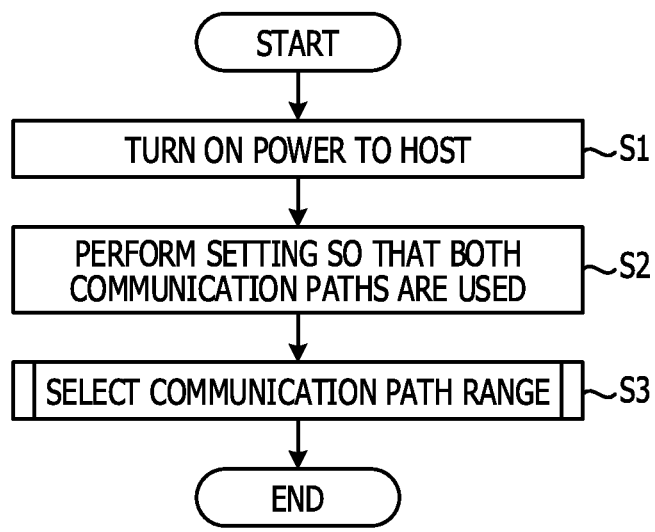
FIG. 3 is a flowchart illustrating communication between a host device and a storage device performed in the information processing device according to the first embodiment.

Next, a flow of the communication between the host device and the storage device performed in the information processing device according to the first embodiment is described with reference to FIG. 3. FIG. 3 is a flowchart illustrating the communication between the host device and the storage device performed in the information processing device according to the first embodiment.

An operator turns on power to the host device 1. When the power to the host device 1 is turned on, the arithmetic processing unit 11 starts to execute the OS (S1).

The path range selecting unit 13 stores, in the communication setting storing unit 15, setting information designating a path range for the unlimited communication in which both of the communication paths 31 and 32 that connect the storage device 2 and the host device 1 are used in the communication so that both of the communication paths 31 and 32 that connect the storage device 2 and the host device 1 are used in the communication (S2).

Thereafter, the path range selecting unit 13 selects a communication path range on the basis of the response time of communication using one or both of the communication paths 31 and 32 (S3). Then, the path range selecting unit 13 stores setting information designating the selected communication path range in the communication setting storing unit 15. The communication control unit 12 performs communication with the storage device 2 through a communication path included in the communication path range designated by the setting information stored in the communication setting storing unit 15.

Figure 4:
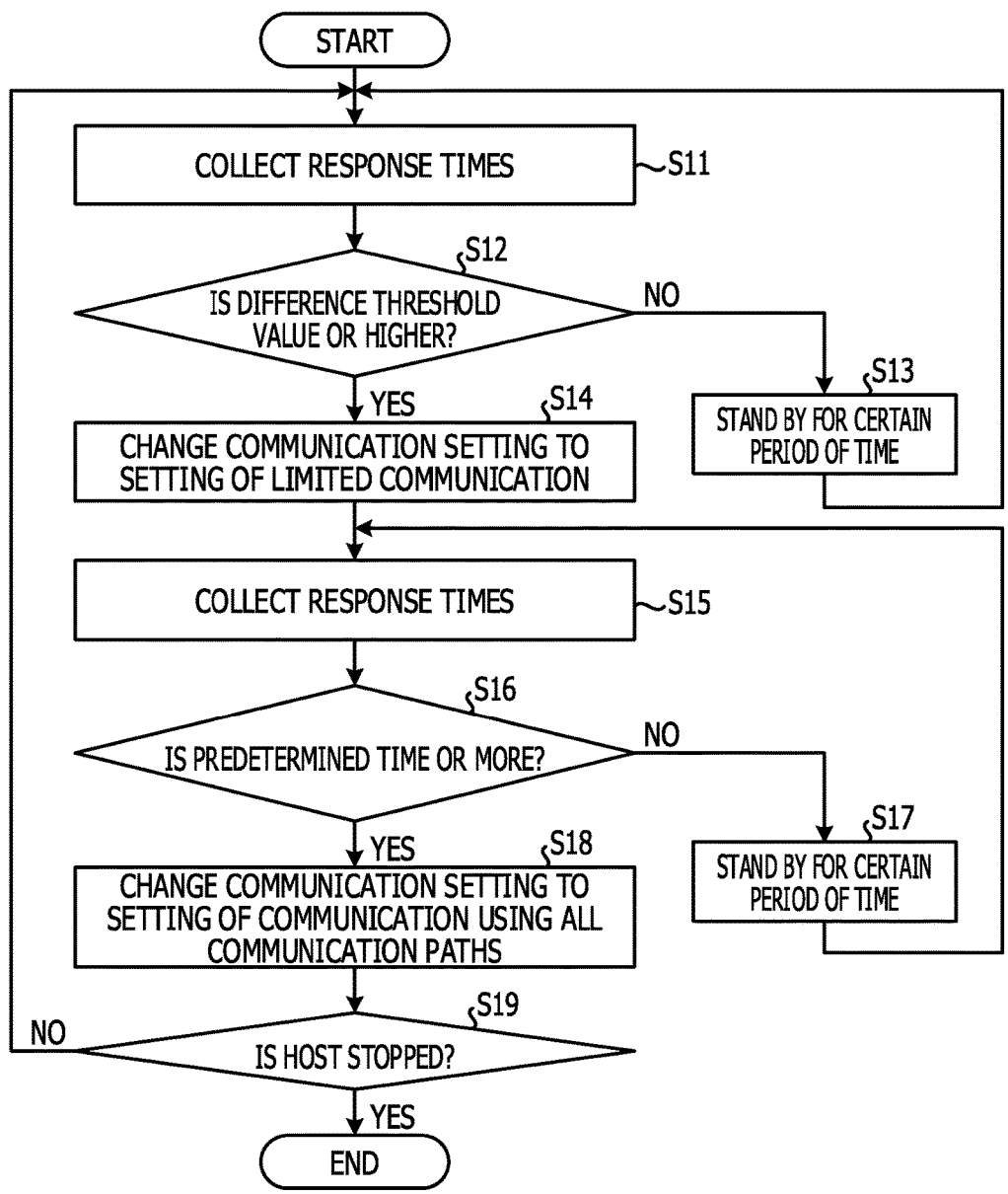
FIG. 4 is a flowchart illustrating details of a path range selecting process performed in the information processing device according to the first embodiment.

Next, details of the path range selecting process performed in the information processing device according to the first embodiment are described with reference to FIG. 4. FIG. 4 is a flowchart illustrating details of the path range selecting process performed in the information processing device according to the first embodiment. The process illustrated in FIG. 4 is an example of the process performed in S3 in FIG. 3.

The response time measuring unit 14 measures response times of communication through the respective communication paths 31 and 32. The path range selecting unit 13 collects and maintains the response times of communication through the respective communication paths 31 and 32 measured by the response time measuring unit 14 (S11).

The path range selecting unit 13 obtains averages of the response times of communication using the respective communication paths 31 and 32, and sets the average response times to the response times of the respective communication paths. Then, the path range selecting unit 13 determines whether the difference in the response times of communication using the communication paths 31 and 32 is equal to or greater than a threshold value (S12). If the difference in the response times is less than the threshold value (S12: No), the path range selecting unit 13 stands by for a certain period of time (S13), and then returns to S11.

If the difference in the response times is equal to or greater than the threshold value (S12: Yes), the path range selecting unit 13 changes the setting information stored in the communication setting storing unit 15 to setting information for the limited communication in which only the communication path of which the response time is shorter is used (S14).

Thereafter, the response time measuring unit 14 measures the response times of communication through the communication path which is currently used between the communication paths 31 and 32. The path range selecting unit 13 collects and maintains the response times measured by the response time measuring unit 14 (S15).

The path range selecting unit 13 obtains an average of the response times of communication through the currently used communication path, and set the average response time to be the response time of communication. Then, the path range selecting unit 13 determines whether the response time of communication through the currently used communication path is equal to or greater than a predetermined time (S16). If the response time is less than the predetermined time (S16: No), the path range selecting unit 13 stands by for a certain period of time (S17), and returns to S15.

If the response time is equal to or greater than the predetermined time (S16: Yes), the path range selecting unit 13 changes the setting information stored in the communication setting storing unit 15 to setting information for the unlimited communication in which both of the communication paths 31 and 32 are used (S18).

The path range selecting unit 13 determines whether the host device 1 is to stop, for example, the host device 1 is shutting down (S19). If the host device 1 continues to run (S19: No), the path range selecting unit 13 returns to S11. If the host device 1 is to stop (S19: Yes), the path range selecting unit 13 ends the path range selecting process. In FIG. 4, for convenience of explanation, it is determined whether the host device is to stop or not in S19, but practically, if the host device is to stop at any stage in FIG. 4, the path range selecting unit 13 stops the path range selecting process.

As described above, when the information processing device according to the first embodiment performs disk access by using two communication paths, if there is a certain difference in the response times of the communication paths, the disk access is changed to be performed by using the communication path of which the response time is shorter. Further, when the information processing device performs the disk access by using only one of the communication paths, if the response time is long, the information processing device according to the first embodiment performs the disk access by using both of the communication paths. According to this, it is possible to reduce the performance deterioration caused by a mixture of communication paths having fast response time and communication paths having slow response time, such as the straight access and the cross access.

When there is a difference in response times of two communication paths, it may be considered that there are not many I/O requests. Therefore, there may be no problem even if the communication is limited to one communication path. When the response time of communication using one communication path becomes long, it may be considered that there are many I/O requests. In this case, even if the communication is performed by using two communication paths, it is considered that the difference in the response times is small. Therefore, there may be no problem.

The host device may determine that the I/O performance of the storage device is poor on the basis of the average of the response times. Thus, the information processing device according to the first embodiment may avoid an erroneous determination of the host device based on the deterioration of the response caused by the communication path having the long response time.

Even if the performance of the path is changed by the switching of a disk and a controller corresponding to the disk, due to an error in a path that connects a host device and the disk, the information processing device according to the first embodiment may achieve the effect described above.

Next, a modification of the first embodiment is described. In the first embodiment, the case where one application is running is described. However, the information processing device according to the modification is different from that according to the first embodiment in that a plurality of applications are running. The functional configuration of the information processing device in this modification is also illustrated by the diagram of FIG. 1.

When a plurality of applications are running, the applications may respectively use different disks. In this case, it is preferable to determine the deterioration of the responses of communication paths for each application.

When a plurality of applications are running, the response time measuring unit 14 measures the response times of one or both of the communication paths 31 and 32 for each application, and notifies the path range selecting unit 13 of the measured response times.

The path range selecting unit 13 obtains the response times of the respective communication paths 31 and 32 for each application by using the results measured by the response time measuring unit 14. Then, the path range selecting unit 13 selects a path range for each application, between a path range for the limited communication and a path range for the unlimited communication. After that, the path range selecting unit 13 stores setting information designating the selected path range for each application in the communication setting storing unit 15.

The communication control unit 12 performs the limited communication or the unlimited communication for each application in accordance with the setting information for each application, stored in the communication setting storing unit 15.

As described above in the modification, even when a plurality of applications are running in the information processing device, it is possible to reduce the deterioration of the responses for each application.

In the modification, control is performed so that the deterioration of the responses is reduced for all applications, but applications for which the deterioration of the response is reduced may be selectively determined. Among the applications, it may be preferable to maintain a high speed response for some applications, while variations in responses may be allowed in other applications. Therefore, among applications to run, applications for which it is preferable to maintain a high speed response are designated in advance, and the path range selecting unit 13 may select the communication path range only for the designated applications.

According to this, if there are a plurality of applications, it is possible to reduce the load of the path range selecting process, and it is possible to realize more appropriate running of the applications.

Second Embodiment

Figure 5:
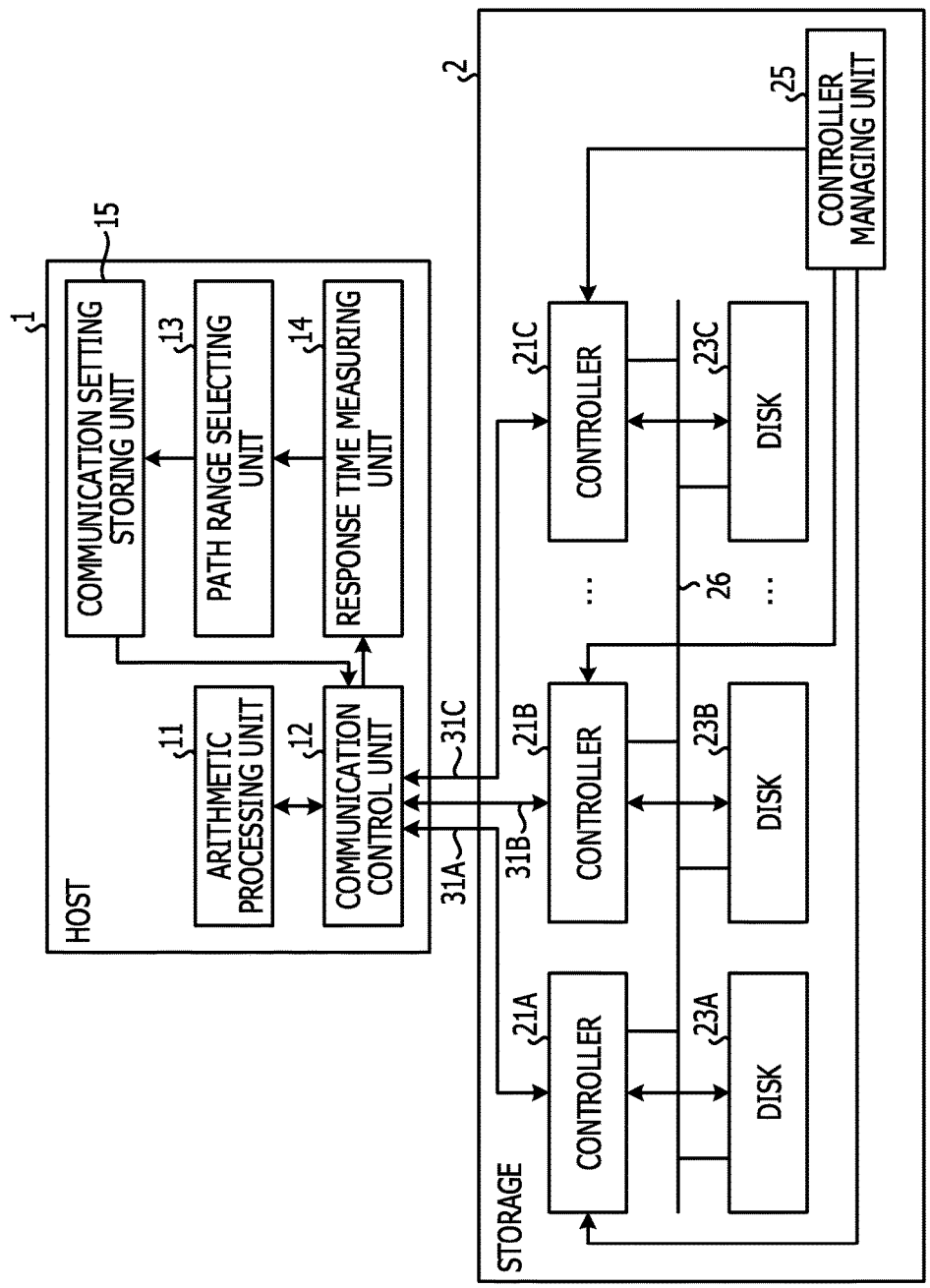
FIG. 5 is a diagram illustrating a functional configuration of an information processing device according to a second embodiment.

FIG. 5 is a diagram illustrating a functional configuration of an information processing device according to a second embodiment. In the first embodiment, there are two controllers and two communication paths, but the information processing device according to the second embodiment is different from that in the first embodiment in that there are three or more controllers and three or more communication paths. In the description below, descriptions of the functions of the respective elements which are similar to those in the first embodiment are omitted.

Controllers 21A to 21C have the same functions as the controllers 21 and 22 in FIG. 1. The controllers 21A to 21C are connected to the communication control unit 12 respectively through communication paths 31A to 31C. The controllers 21A to 21C respectively control disks 23A to 23C.

The response time measuring unit 14 obtains the response times of all communication paths in a state in which the communication using all the communication paths 31A to 31C is performed, that is, the unlimited communication is performed.

The path range selecting unit 13 receives the response times of all the communication paths from the response time measuring unit 14. Then, the path range selecting unit 13 identifies the communication paths for which the differences in the responses from that for the communication path having the fastest response are equal to or greater than a threshold value. Then, the path range selecting unit 13 changes the setting information stored in the communication setting storing unit 15 to setting information for the limited communication in which only the communication paths excluding the identified communication paths are used.

In the state in which the limited communication is performed, if the response times of all the communication paths used in the limited communication among the communication paths 31A to 31C are equal to or greater than a predetermined time, the path range selecting unit 13 changes the setting information stored in the communication setting storing unit 15 to setting information for the unlimited communication.

For example, if the straight access and the cross access are mixed, the response times of communication paths that perform the straight access may be substantially the same as each other, and the response times of communication paths that perform the cross access may be substantially the same as each other. In this manner, even if a plurality of communication paths exist, it is possible to extract communication paths that have response times of substantially the same speed by comparing the communication paths with the communication path having the fastest response, and excluding the communication paths for which the difference in the responses is equal to or greater than the threshold value, so that the deterioration of the response time may be reduced.

Third Embodiment

Figure 6:
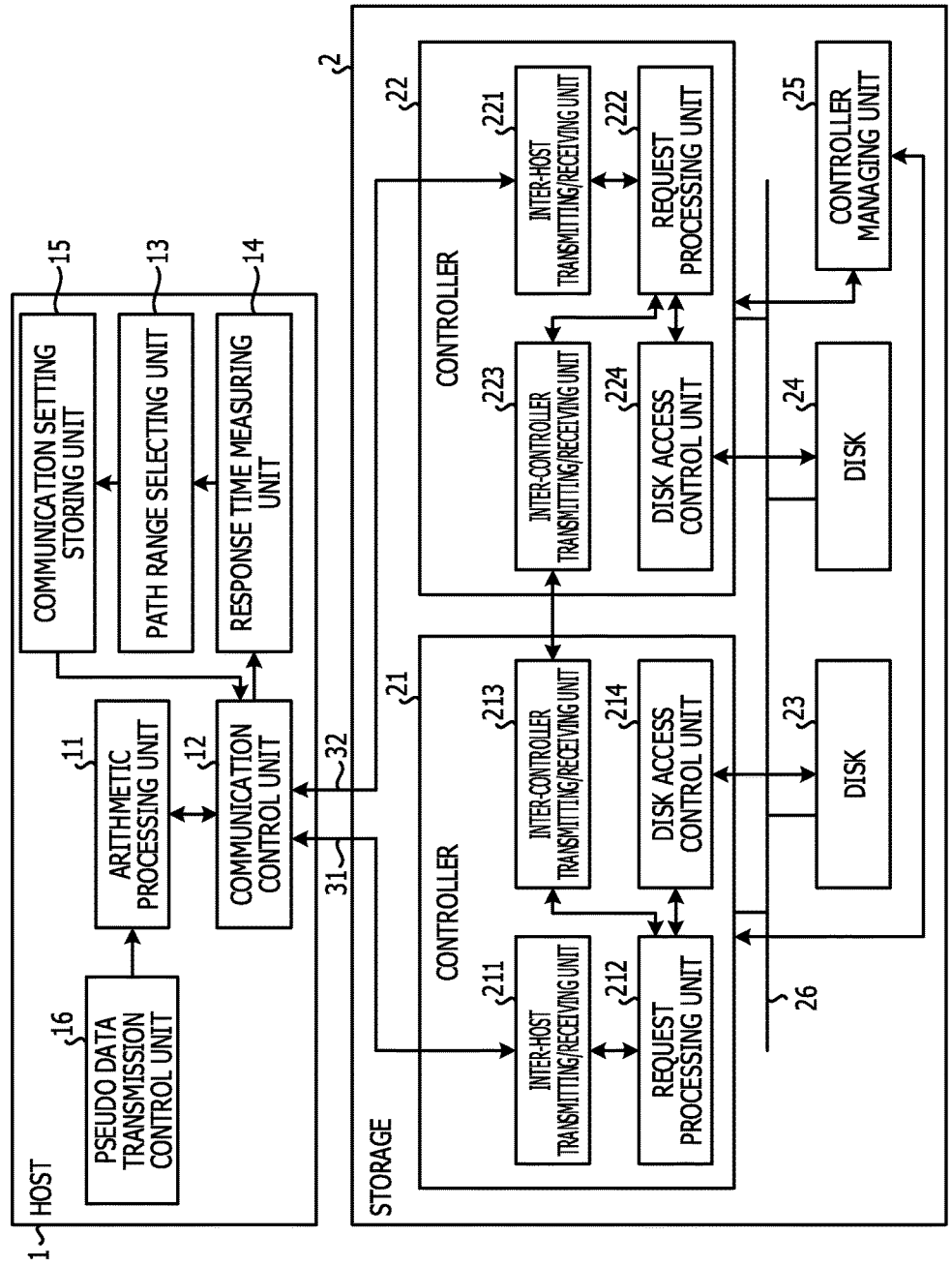
FIG. 6 is a diagram illustrating a functional configuration of an information processing device according to a third embodiment.

FIG. 6 is a diagram illustrating a functional configuration of an information processing device according to a third embodiment. The information processing device according to the third embodiment is different from that according to the first embodiment in that the communication path range is first selected by anticipating the response time by using pseudo data. The information processing device according to the third embodiment has a configuration in which a pseudo data transmission control unit 16 is added to the host device 1 of the information processing device according to the first embodiment. In the description below, descriptions of the functions in the elements which are similar to those in the first embodiment are omitted.

The pseudo data transmission control unit 16 stores in advance the pseudo data to be used in a test. If the size of the pseudo data is small, the process may be easily performed. Therefore, there is a concern that the difference in the response times may not be detected even in a path that is expected to have a difference in a response time. Thus, it is preferable that the pseudo data be set to have a size that may cause a difference in response times between the communication paths 31 and 32 to be detected depending on the configuration and the performance of the information processing device.

When the power to the host device 1 is turned on and the host device 1 starts to execute the OS, the pseudo data transmission control unit 16 instructs the arithmetic processing unit 11 to transmit the stored pseudo data and an I/O request using the pseudo data. In the following, a case where the deterioration of the response times of the disk access to the disk 24 is reduced is described.

The arithmetic processing unit 11 transmits the I/O request regarding the disk 24, with the pseudo data received from the pseudo data transmission control unit 16, to the storage device 2 using both of the communication paths 31 and 32 via the communication control unit 12.

The response time measuring unit 14 measures the response times of communication through the respective communication paths 31 and 32, for the I/O request regarding the disk 24 with the pseudo data. Then, the response time measuring unit 14 outputs the measurement results to the path range selecting unit 13.

The path range selecting unit 13 compares the response time of communication through the communication path 31 received from the response time measuring unit 14 with the response time of communication through the communication path 32, when the pseudo data is used. Then, the path range selecting unit 13 stores, in the communication setting storing unit 15, setting information designating only the communication path of which the response time is shorter.

The communication control unit 12 starts communication for I/O requests from the application by using only the communication path of which the response time is shorter when the pseudo data is used in accordance with the setting information stored in the communication setting storing unit 15.

Thereafter, the communication control unit 12, the path range selecting unit 13, and the response time measuring unit 14 select the communication path range by using actual I/O requests from the application in the same manner as in the first embodiment.

Figure 7:
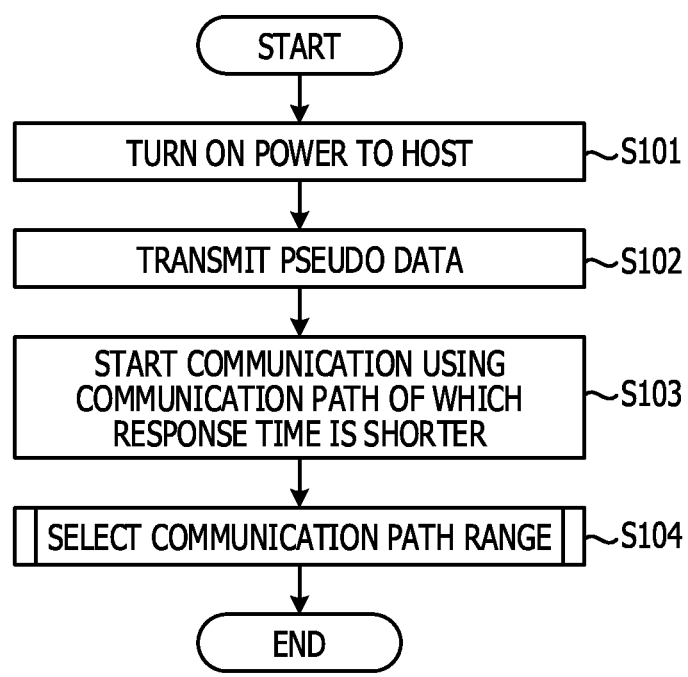
FIG. 7 is a flowchart illustrating communication between a host device and a storage device performed in the information processing device according to the third embodiment.

Next, a flow of the communication between the host device and the storage device performed in the information processing device according to the third embodiment is described with reference to FIG. 7. FIG. 7 is a flowchart illustrating the communication between the host device and the storage device performed in the information processing device according to the third embodiment.

An operator turns on the power to the host device 1. When the power to the host device 1 is turned on, the arithmetic processing unit 11 starts to execute the OS (S101).

The pseudo data transmission control unit 16 instructs the arithmetic processing unit 11 to transmit the pseudo data. The arithmetic processing unit 11 transmits the pseudo data through the respective communication paths 31 and 32 via the communication control unit 12 (S102).

The response time measuring unit 14 measures the response times of communication through the respective communication paths 31 and 32, for the I/O request with the pseudo data. The path range selecting unit 13 compares the response time of communication through the communication path 31 with the response time of communication through the communication path 32 when the pseudo data is used. The path range selecting unit 13 stores, in the communication setting storing unit 15, setting information for the limited communication, which designates only the communication path of which the response time is shorter. The communication control unit 12 refers to the communication setting storing unit 15, and starts communication for I/O requests from the application, by using only the communication path of which the response time is shorter when pseudo data is used (S103).

Thereafter, the path range selecting unit 13 selects the communication path range on the basis of the response times for I/O requests from the application (S104). An example of the process performed in S104 is a process illustrated in FIG. 4. The communication control unit 12 performs the communication with the storage device 2 using the communication path range selected by the path range selecting unit 13.

As described above, the information processing device according to the third embodiment first measures the response time of communication through the respective communication paths using the pseudo data, and starts the communication through the communication path of which the response time is shorter. According to this, it is possible to perform the communication through the communication path of which the response time is shorter from the beginning so that the deterioration of the response may be reduced.

Figure 8:
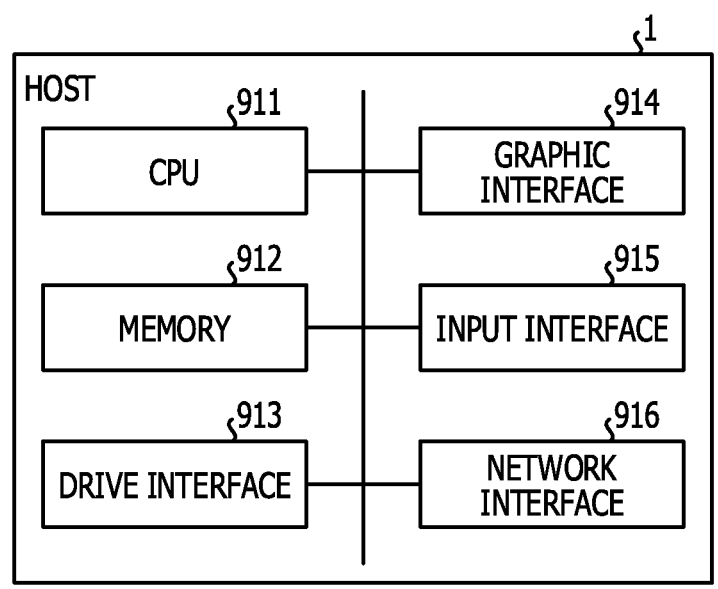
FIG. 8 is a diagram illustrating an example of a hardware configuration of a host device.
Figure 9:
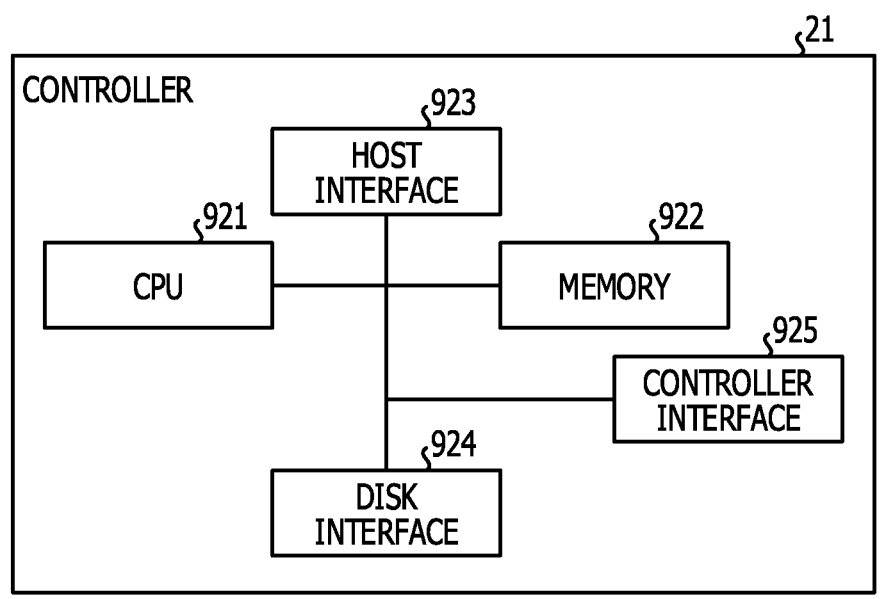
FIG. 9 is a diagram illustrating an example of a hardware configuration of a controller.

Next, hardware configuration of the information processing device according to the embodiments is described with reference to FIGS. 8 and 9. FIG. 8 is a diagram illustrating an example of a hardware configuration of the host device. FIG. 9 is a diagram illustrating an example of a hardware configuration of the controller.

As illustrated in FIG. 8, the host device 1 includes a central processing unit (CPU) 911, a memory 912, a drive interface 913, a graphic interface 914, an input interface 915, and a network interface 916.

The memory 912, the drive interface 913, the graphic interface 914, the input interface 915, and the network interface 916 are respectively connected to the CPU 911 through a bus.

The drive interface 913 is an interface with the storage device 2 such as a host bus adapter (HBA). A monitor or the like is connected to the graphic interface 914. A mouse or a keyboard is connected to the input interface 915. The network interface 916 is an interface for a connection with a network.

An OS, and various kinds of programs that realize respective functions of the arithmetic processing unit 11, the communication control unit 12, the path range selecting unit 13, the response time measuring unit 14, and the pseudo data transmission control unit 16 illustrated in FIG. 1, 5, or 6 are stored in the disk 23 or 24 included in the storage device 2.

The memory 912 realizes the function of the communication setting storing unit 15 illustrated in FIG. 1, 5, or 6.

The CPU 911 reads various kinds of programs from the storage device 2 through the drive interface 913, and loads the programs on the memory 912 to execute the programs. According to this, the CPU 911 and the memory 912 realize respective functions of the arithmetic processing unit 11, the communication control unit 12, the path range selecting unit 13, the response time measuring unit 14, and the pseudo data transmission control unit 16 illustrated in FIG. 1, 5, or 6.

As illustrated in FIG. 9, the controller 21 includes a CPU 921, a memory 922, a host interface 923, a disk interface 924, and a controller interface 925.

The memory 922, the host interface 923, the disk interface 924, and the controller interface 925 are respectively connected to the CPU 921 through a bus.

The host interface 923 is an interface with the host device 1. The host interface 923 is connected to the drive interface 913 of FIG. 8. The host interface 923 receives an I/O request from the drive interface 913. The host interface 923 transmits, to the drive interface 913, a response to the I/O request.

The disk interface 924 is an interface for a connection with the disks 23 and 24. The disk interface 924 transmits the I/O request to the disks 23 and 24.

The controller interface 925 is an interface for a connection with other controllers such as the controller 22. The controller interface 925 transmits and receives the I/O request to and from the controller 22.

Various kinds of programs including programs for realizing respective functions of the inter-host transmitting/receiving unit 211, the request processing unit 212, the inter-controller transmitting/receiving unit 213, and the disk access control unit 214 illustrated in FIG. 1 or 6 are stored in the memory 922.

The CPU 921 reads various kinds of programs from the memory 922 to execute the programs. According to this, the CPU 921 and the memory 922 realize the respective functions of the inter-host transmitting/receiving unit 211, the request processing unit 212, the inter-controller transmitting/receiving unit 213, and the disk access control unit 214 illustrated in FIGS. 1 and 6.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device, comprising:
a first storage unit configured to
store therein setting information designating a path range, the path range being one of a subset of a plurality of communication paths and a full set of the plurality of communication paths, the subset being used in a limited communication, the full set being used in an unlimited communication; and
a processor configured to
determine whether to perform the limited communication or the unlimited communication,
when it is determined to perform the limited communication,
perform communication through each communication path included in the subset,
acquire performance information of each of the communication paths included in the subset, the performance information indicating a performance of communication through a communication path, and
compare the performance information of each of the communication paths included in the subset to a predetermined value and, when at least one of the communication paths included in the subset has performance information that is equal to or exceeds the predetermined value, switch to perform the unlimited communication, and
when it is determined to perform the unlimited communication,
perform communication through all of the communication paths in the full set,
acquire performance information of each of the communication paths included in the full set, and
when a difference between the performance information of a first communication path included in the full set and the performance information of a second communication path included in the full set becomes equal to or greater than a threshold value, switch to perform the limited communication using a subset that excludes one of the first communication path and the second communication path.

2. The information processing device according to claim 1, wherein
an index of the performance is a response time, and
the processor is configured to
execute an application program, and
measure a response time of communication generated by the execution of the application program to acquire the performance information.

3. The information processing device according to claim 1, wherein
the processor is configured to
execute a plurality of application programs, and
acquire the performance information for each of the application programs.

4. The information processing device according to claim 1, wherein
the processor is configured to
transmit, when power to the information processing device is turned on, pseudo data through each of the plurality of communication paths to acquire initial performance information of each of the plurality of communication paths,
select an initial path range based on the acquired initial performance information, and
store initial setting information designating the selected initial path range in the first storage unit.

5. The information processing device according to claim 1, wherein
the plurality of communication paths are two paths, and
the processor is configured to
select, when a difference of performances between the two paths becomes equal to or greater than the threshold value during the unlimited communication, a communication path having a better performance between the two paths.

6. The information processing device according to claim 1, further comprising:
control units connected to one another, the control units respectively corresponding to the plurality of communication paths, the control units being respectively assigned to data storage units, the control units being respectively connected to the assigned data storage units without another control unit being interposed,
wherein
the processor is configured to
select, when performing communication with a first data storage unit assigned to a first control unit, between a first communication and a second communication, the first communication being performed with the first control unit through a first communication path corresponding to the first control unit, the second communication being performed via a second control unit other than the first control unit through a second communication path corresponding to the second control unit.

7. A non-transitory computer-readable recording medium having stored therein a program for causing a computer to execute a process, the process comprising:
   determining whether to perform a limited communication using a subset of a plurality of communication paths or to perform an unlimited communication using a full set of the plurality of communication paths;
   when it is determined to perform the limited communication,
      performing communication through each communication path included in the subset;
      acquiring performance information of each of the communication paths included in the subset, the performance information indicating a performance of communication through a communication path; and
      comparing the performance information of each of the communication paths included in the subset to a predetermined value and, when at least one of the communication paths included in the subset has performance information that is equal to or exceeds the predetermined value, switching to perform the unlimited communication; and
   when it is determined to perform the unlimited communication,
      performing communication through all of the communication paths in the full set,
      acquiring performance information of each of the communication paths included in the full set, and
      when a difference between the performance information of a first communication path included in the full set and the performance information of a second communication path included in the full set becomes equal to or greater than a threshold value, switching to perform the limited communication using a subset that excludes one of the first communication path and the second communication path.

8. A method for determining a path range, the method comprising:
   determining, by a computer, whether to perform a limited communication using a subset of a plurality of communication paths or to perform an unlimited communication using a full set of the plurality of communication paths;
   when it is determined to perform the limited communication,
      performing communication through each communication path included in the subset;
      acquiring performance information of each of the communication paths included in the subset, the performance information indicating a performance of communication through a communication path; and
      comparing the performance information of each of the communication paths included in the subset to a predetermined value and, when at least one of the communication paths included in the subset has performance information that is equal to or exceeds the predetermined value, switching to perform the unlimited communication; and
   when it is determined to perform the unlimited communication,
      performing communication through all of the communication paths in the full set;
      acquiring performance information of each of the communication paths included in the full set; and
      when a difference between the performance information of a first communication path included in the full set and the performance information of a second communication path included in the full set becomes equal to or greater than a threshold value, switching to perform the limited communication using a subset that excludes one of the first communication path and the second communication path.

* * * * *